May 9, 1950 — V. E. CARBONARA ET AL — 2,507,367
INSTRUMENT FOR CORRELATING ANGLE OF ATTACK AND AIR SPEED
Filed April 1, 1944 — 3 Sheets-Sheet 1

INVENTORS
Victor E. Carbonara
BY John H. Andresen, Jr.
Myron J. Seibold
ATTORNEY May 9, 1950  V. E. CARBONARA ET AL  2,507,367
INSTRUMENT FOR CORRELATING ANGLE OF
ATTACK AND AIR SPEED
Filed April 1, 1944  3 Sheets-Sheet 2

INVENTORS
*Victor E. Carbonara*
BY *John H. Andresen, Jr.*

*Myron J. Seibold*
ATTORNEY

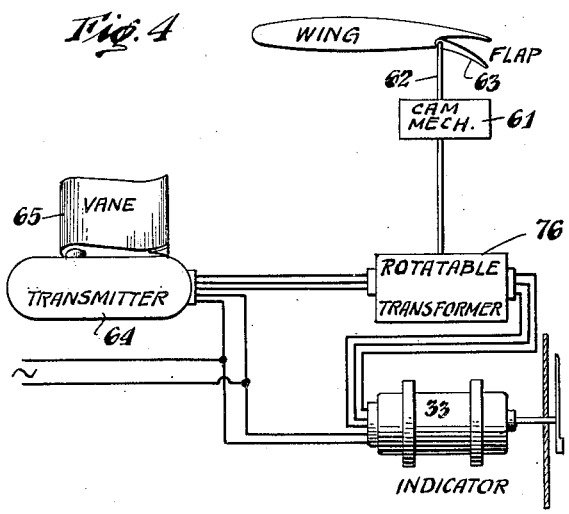
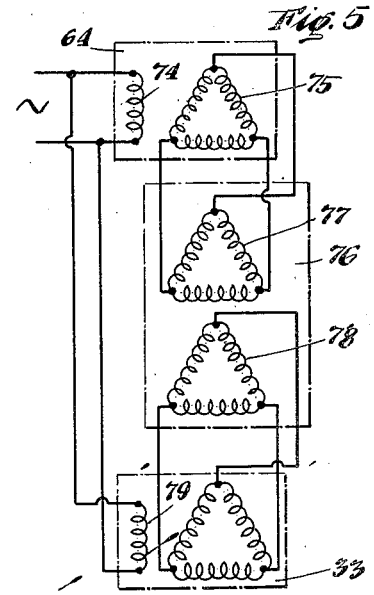
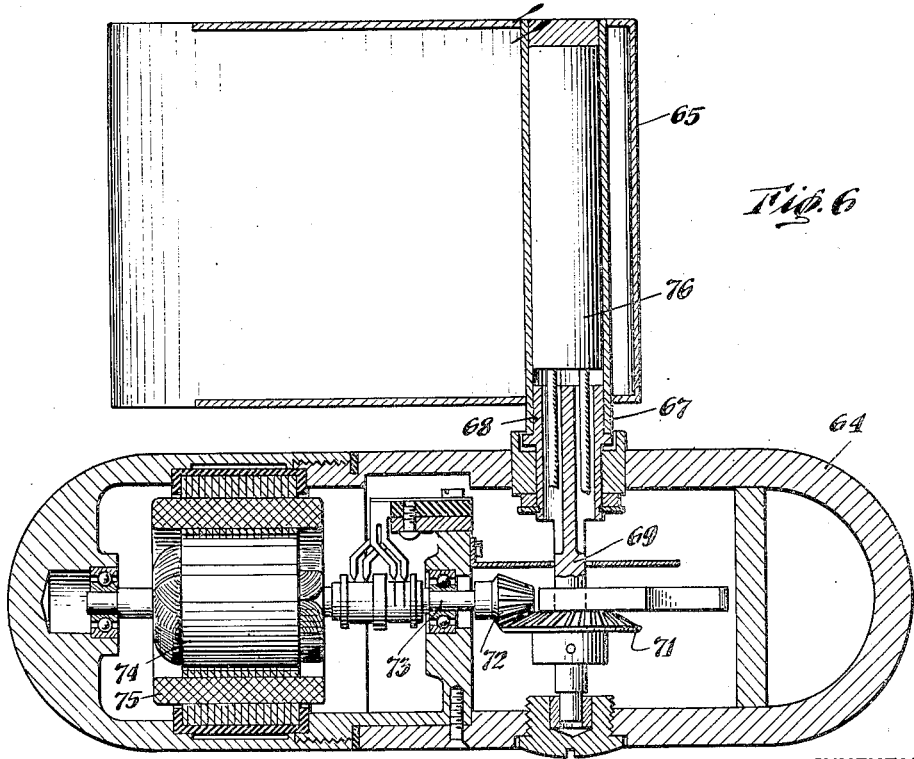

Patented May 9, 1950

2,507,367

UNITED STATES PATENT OFFICE 2,507,367

INSTRUMENT FOR CORRELATING ANGLE OF ATTACK AND AIR SPEED

Victor E. Carbonara, Manhasset, and John H. Andresen, Jr., Port Washington, N. Y., assignors to Square D Company, Detroit, Mich., a corporation of Michigan Application April 1, 1944, Serial No. 529,108

14 Claims. (Cl. 73—178)

This invention relates to flight aids for aircraft and has for one of its objects the correlation of airspeed and angle of attack indications in one instrument.

Another object of the invention is the provision of an aircraft instrument which shall continuously register both the indicated airspeed of the aircraft and the angle of attack under which it is operating.

Another object of the invention is the provision of an aircraft instrument having relatively movable dials bearing indicia respectively of airspeed and angle of attack with a single pointer cooperating with both dials to indicate the values thereof at which the aircraft is operating.

Another object of the invention is to provide an angle of attack indicator, whether or not combined with airspeed indication, with means, either electrical or mechanical, for properly varying the indication of the angle of attack with the use of wing flaps or slots on the aircraft.

Another object of the invention is to provide a combined airspeed and angle of attack indicating instrument in which an indication is provided of the sense relation of indicated airspeed to the airspeed corresponding to stalling angle of attack and/or the angle of attack for maximum ratio of lift to drag.

Other objects and features of the invention will be readily apparent to those skilled in the art from the specification and appended drawing illustrating certain preferred embodiments in which:

Figure 4 is a schematic representation of an electrical connection for modification of the indication of angle of attack with the use of wing flaps.

Figure 5 is a schematic wiring diagram for the system of Figure 4.

Figure 6 is a longitudinal sectional view of the actuator or transmitter for the angle of attack responsive portion of the instrument.

Figure 1:
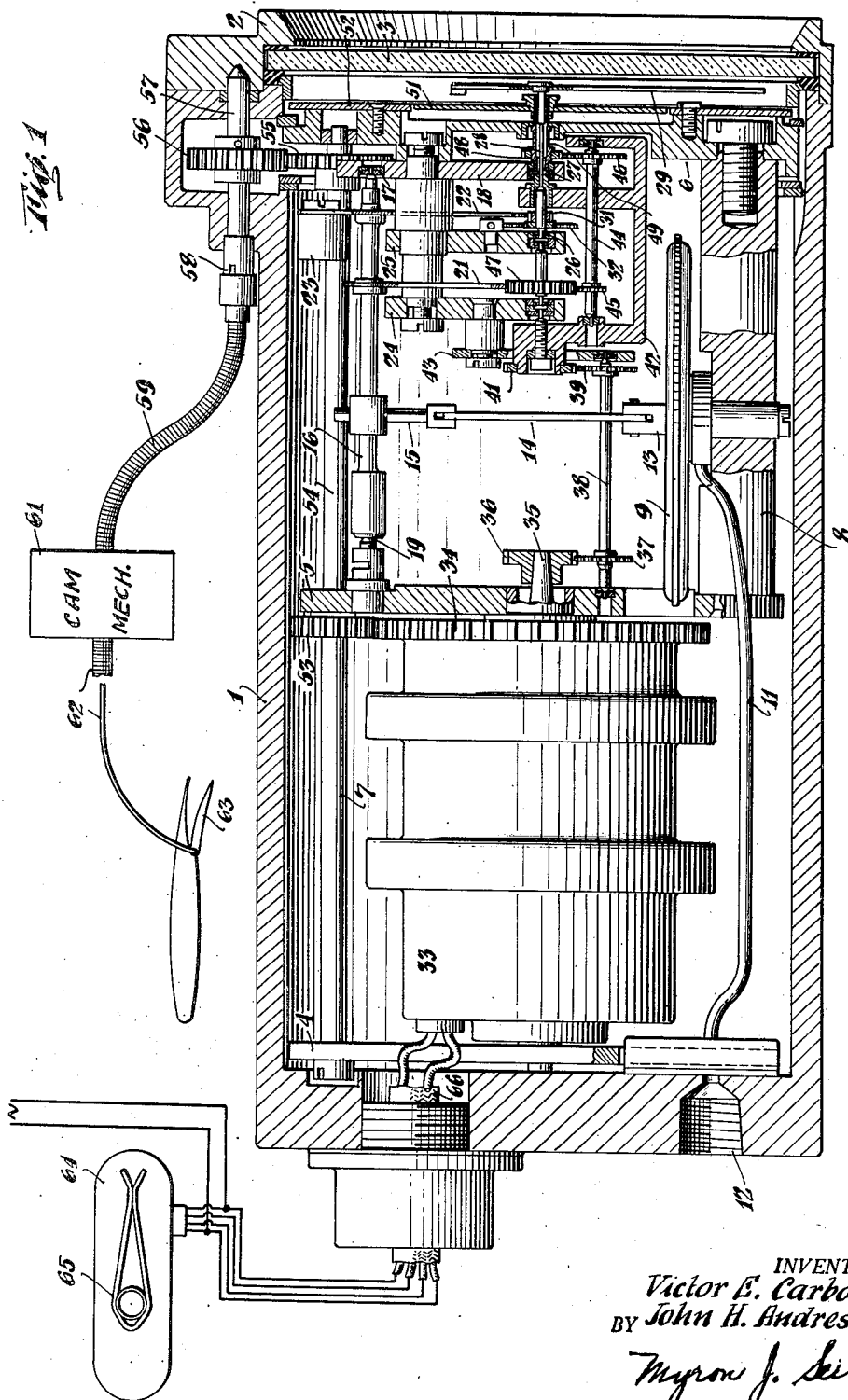
Figure 1 is a longitudinal sectional view through a combined instrument according to the present invention with certain parts rotated into the plane of the drawing for simplicity of disclosure, with certain of the parts shown in elevation and with a diagrammatic representation of the actuator and wing flap modifier for the angle of attack portion of the instrument.

The instrument as shown in Figure 1 embodies a cup shaped main body portion 1 having a cover 2 therefor in which is disposed a transparent window 3 for viewing the dials and pointer of the instrument, the body portion, cover and window being sealed to provide an airtight enclosure which is connected to the static outlet of a Pitot static tube, not shown. The operating parts of the instrument are mounted upon three spaced stationary frame plates 4, 5 and 6 connected together by elongated rods 7, only one of which is shown. Between the plates 5 and 6, there is mounted a stationary support 8 which carries a diaphragm capsule 9, the interior of which is connected by tubing 11 to an opening 12 in the rear wall of the enclosure which is adapted to be connected to the Pitot opening of a Pitot static tube. The movable boss 13 on the aneroid capsule 9 is connected through link 14 to an arm 15 on a rockshaft 16 which is pivoted at one end at 17 in a stationary bearing within a stationary supporting plate 18 rigidly mounted upon the plate 6. The opposite end of rockshaft 16 is pivoted at 19 on an adjustable bearing mounted in the frame plate 5. The rockshaft 16 carries a pair of gear sectors 21 and 22, the sector 22 having an extension upon which is mounted a counterweight 23.

Rigidly supported from the frame plate 6 are additional stationary supporting plates 24, 25. Pivotally mounted at bearing 26 in supporting plate 25 and bearing 27 in supporting plate 18 is a shaft 28 carrying at its forward end the pointer 29. Rigid with the shaft 28 is a gear wheel 31 with which is meshed the sector 22 to provide for direct rotation of the pointer 29 in response to rotation of the rockshaft 16. A light biasing spring 32 is provided to take up any backlash in the gearing.

Between the plates 4 and 5 there is disposed a self-synchronous receiver 33, the stator body of which is pivotally mounted within the plates for rotation bodily about its longitudinal axis, the body portion being provided with a gear wheel 34 for this purpose. The rotor shaft of the self-synchronous receiver 33 is indicated at 35 and carries a gear wheel 36 meshing with a pinion 37 mounted upon one end of a rotatable shaft 38 whose opposite end carries a second pinion 39 meshing with a gear wheel 41 rigidly mounted upon the hub of a rotatable frame 42. The shaft 38 is pivoted in bearings within plate 5 and an auxiliary supporting plate 43 rigidly mounted upon the plate 24.

The frame 42 is pivoted for rotation in the bearings indicated in plates 24 and 18 about an axis coincident with the axis of the pointer shaft 28. Within the frame 42 is mounted a rotatable shaft 44 carrying a pair of pinions 45 and 46. The pinion 45 meshes with an idler pinion 47 rotatable in stationary bearings about an axis coincident with the axis of rotation of the frame 42. The sector 21 on the rockshaft 16 also meshes with the pinion 47. The pinion 46 meshes with a gear wheel 48 rigid with a hollow shaft 49 pivoted within bearings in the supporting plates 18 and 6 and carrying, at its forward end, a rotatable dial 51 bearing the indicia of angle of attack. Upon the supporting frame plate 6 is rigidly secured a stationary dial 52 bearing the indicia of indicated airspeed.

Meshing with the ring gear 34 is a pinion 53 mounted upon one end of a shaft 54 rotatable in bearings carried by the frame plates 5 and 6. The opposite end of the shaft 54 is provided with a pinion 55 meshing with a gear 56 carried on a shaft 57 pivotally mounted in the main body portion of the enclosure and provided with a key connection at 58. The connection 58 leads through flexible shaft 59 to a cam mechanism 61, diagrammatically illustrated, which is actuated by a flexible shaft 62 connecting to and rotatable with the flap 63 on the aircraft wing.

At the upper left hand corner of Figure 1, there is diagrammatically illustrated the self-synchronous transmitter enclosure 64 and the wind vane 65 which operates it, connected by the wiring, schematically shown, to the self-synchronous receiver 33. The internal leads within the casing indicated at 66 are flexible leads to provide for a limited rotation of the stator body portion of the self-synchronous receiver.

Figure 2:
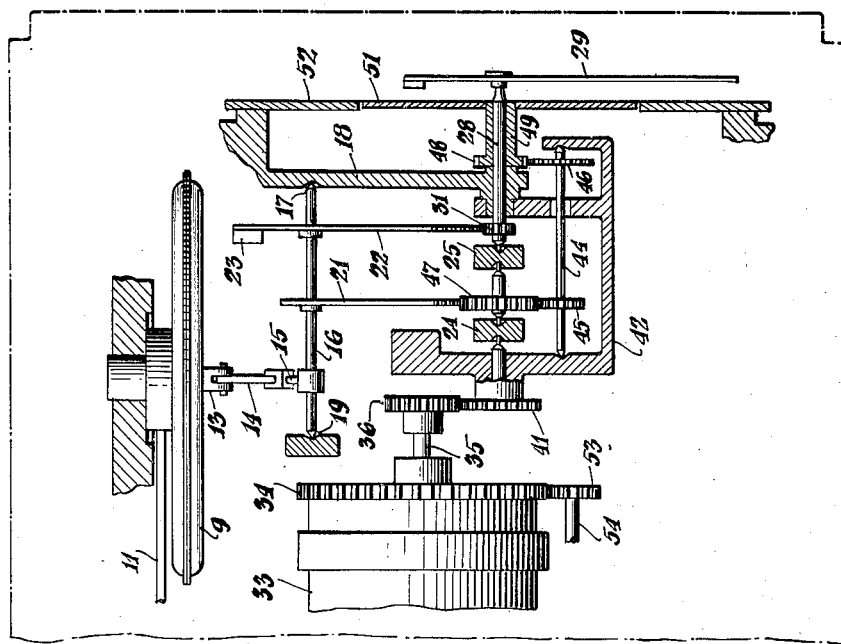
Fig. 2 is a simplified schematic outline of the salient parts of the combined instrument.

In Figure 2, the combined instrument is diagrammatically shown for simplicity and like reference numerals have been used where applicable.

In Figure 6 is shown the self-synchronous transmitter and the wind vane for actuating the angle of attack responsive portion of the instrument. This involves a vane 65 which is adapted to be disposed in the air stream where it will assume a position with its chord parallel to the air stream. The vane is mounted upon a hollow tube 67 mounted upon a hub 68 pivoted within a bearing within a side wall of the housing 64 and carrying at its interior end a shaft 69 connected through bevel gears 71 and 72 to a shaft 73 upon which is mounted the rotor 74 of the self-synchronous transmitter whose three phase stator is indicated at 75. A heating coil is indicated at 76 and is provided to prevent the building up of ice upon the wind vane. The position of the enclosure 64 of the transmitter is fixed with relation to the plane wing so that as the angle of attack of the wing with respect to the air stream changes, the vane 65 will rotate with respect to the enclosure 64 and thus effect a rotation of the rotor 74 thus unbalancing the currents generated in the stators of the transmitter and receiver and causing a similar rotation of the rotor of the self-synchronous receiver 33 until the currents are again balanced.

Figure 3:
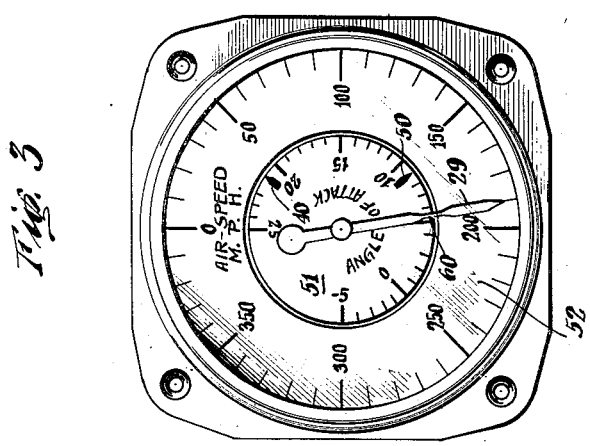
Figure 3 is a view showing the dials and pointer for the combined instrument.

As shown in Figure 3, the pointer 29 has an index at its end by which the indicia of airspeed may be read. It is also provided with a reduced portion 60 at which the indicia of angle of attack may be read. Permanent salient markings are provided upon the angle of attack dial which must be determined for and will presumably be different for each type of aircraft depending upon its structural and operational characteristics. These permanent markings may be placed to give indications as desired for the pilot's use, the ones selected being the critical angles of stall and maximum ratio for lift to drag. Thus the marking at 50 indicates the angle of attack for the maximum ratio of lift to drag to be utilized by the pilot for economical cruising. The marking 49 is placed on the dial to indicate the critical angle of attack for the stall of the aircraft.

In the operation of the device, that portion which is responsive to the pressure of the Pitot tube and gives the indicated airspeed will first be described.

Change in the airspeed will change the pressure of the Pitot tube and will be reflected in movement of the aneroid capsule 9 which, through link 14 and arm 15, will effect rotation of the rockshaft 16 to rotate the gear sectors 21 and 22. Gear sector 22 through gear wheel 31 and shaft 28 will rotate the pointer 29 in the proper direction dependent upon an increase or decrease in indicated airspeed. Gear sector 21 will rotate idler pinion 47 which will, in turn, rotate pinion 45 to rotate shaft 44 and pinion 46, the frame 42 remaining stationary since it moves only in response to change in angle of attack. Rotation of the pinion 46 with the frame 42 stationary will effect rotation of gear wheel 48 and hence hollow shaft 49 to rotate the sub-dial 51. Therefore, with the angle of attack constant a change in airspeed effects rotation of both pointer 29 and dial 51 so that the reading of the pointer with respect to indicated airspeed indicia will change, but the reading of the pointer with respect to the angle of attack dial at the reduced portion 60 will remain the same.

The operation of the angle of attack responsive portion of the instrument while airspeed remains constant will now be described. A change in the angle of attack will cause a change in the position of the vane 65 with relation to the enclosure 64 for the self-synchronous transmitter. This relative rotation of the vane will be reflected through shaft 69, bevel gears 71 and 72, and shaft 73 in a displacement of the rotor 74. This, through the well known action of self-synchronous devices, will effect a corresponding displacement of the rotor of the receiver 33 resulting in rotation of gear wheel 36 upon the shaft 35 of the receiver rotor. Rotation of gear wheel 36 will effect rotation of gear wheel 41 upon the hub of frame 42. In the diagrammatic showing of Figure 2, this is indicated by the direct meshing of gear wheels 36 and 41. In the instrument of Figure 1, gear wheel 36 will rotate pinion 37, shaft 38 and pinion 39 to effect rotation of the gear wheel 41. Rotation of gear wheel 41 effects rotation of the frame 42 whereupon pinions 45 and 46 will rotate about idler pinion 47 and gear wheel 48 while meshed therewith. Pinions 45 and 46 are of different size, however, so that this movement can be effected only by rotating the gear wheel 48 about its axis since the idler pinion 47 remains stationary due to its meshing with the gear sector 21 which remains stationary except during changes in indicated airspeed. This rotation of gear wheel 48 will, through hollow shaft 49, effect rotation of the sub-dial 51 to change the indicia thereof appearing at the pointer 29. This effects a change in the reading of the angle of attack without movement of the pointer 29 and hence without changing the indicated airspeed reading.

The description so far has assumed that indicated airspeed would change without changing the angle of attack or that the angle of attack would change without changing the indicated airspeed. In the operation of the plane, the more common condition will be a concurrent change in both airspeed and angle of attack. The result of a change in both airspeed and angle of attack will be a combined movement of pointer 29 and dial 51 with each of the responsive portions operating at the same time, in the manner above described, but with the movements effected concurrently and in a mutually modifying manner.

The instrument as viewed by the pilot is shown in the representation of Figure 3. In the position shown, the plane is traveling at a speed of 190 miles an hour as indicated by the position of pointer 29 with respect to the indicia of indicated airspeed on dial 52 and at an angle of attack between 5° and 6° as indicated by the position of the reduced portion 60 with respect to the indicia of angle of attack upon dial 51. If angle of attack only is increased without increasing airspeed, the sole change in the instrument will be a rotation of the dial 51 in a clockwise direction. If the airspeed is lowered without changing the angle of attack, both the pointer 29 and the dial 51 will be rotated in a counterclockwise direction. If the airspeed is lowered and the angle of attack increased, as would be the case, for example, in making the landing, the pointer 29 will move in a counterclockwise direction and relative movement between pointer 29 and the dial 51 will also be effected in accordance with the change occurring in the angle of attack. In the use of the instrument in making a landing, the pilot observes the pointer 29 in relation to the angle of attack indicia upon the dial 51 and the airspeed indicia on the dial 52 and as he reduces airspeed notes the mutual approach of the pointer and the stall indicator marking 40 and, therefore, is continuously and definitely informed of his margin of safety before stalling speed is encountered.

Upon airplanes equipped with adjustable flaps or slots, the angle of attack at which the stall condition occurs will be varied depending upon the operative position of such flaps or slots and it is desired to make within the instrument an appropriate angular change in the position of the dial 51 so that the relation of the salient marking 40 with respect to the pointer 29 will still be correct for each operative position of the flaps or slots. In the device so far described, as illustrated in Figures 1 and 2, this adjustment is effected by rotating bodily the housing or stator of the self-synchronous receiver 33. As shown in Figure 1, the wing flap 63 is mechanically connected by means of a flexible cable 62 to a cam mechanism indicated at 61. The interposition of the cam mechanism in the mechanical drive is required because the effect of the flaps upon the stall characteristics of the plane is not a linear function of the position of the flap, but is a complex function which must be determined empirically for each given type of airplane. This function when determined is properly laid out upon a cam mechanism which will interpret the operational position of the flap into the proper rotation of the stator of the self-synchronous receiver. From the cam mechanism 61, the flexible cable 59 drives the shaft 57. Gear wheel 56 on shaft 57 meshes with pinion 55 to rotate shaft 54 and pinion 53 to effect rotation of ring gear 34 and hence rotation bodily of the self-synchronous receiver 33. As this stator is rotated, the rotor will rotate therewith effecting the similar rotation of the gear wheel 36 and through the mechanism previously described will rotate the dial 51 into its proper relation with respect to the indicating pointer 29. Accordingly, regardless of the flap or slot position, the relation between the pointer 29 and the salient marker 40 will correctly indicate the approach of the plane to its stalling condition.

Figures 4 and 5 illustrate diagrammatically the insertion of the wing flap correction for angle of attack within the electrical system of an angle of attack indicator, it being understood that either the mechanical correction previously described or the electrical correction hereinafter described may be applied to an angle of attack instrument as well as to the combined instrument specifically described.

In Figure 4 there is shown the wind vane 65 and transmitter housing 64, the wing flap 63 being connected by the shaft or cable 62 to the cam mechanism 61 which is turn is connected by shaft or cable 59 to the rotatable windings of a rotatable transformer 76. The output of the stator of the transmitter 64 passes through the rotatable transformer 76 before being connected to the stator of the receiver 33. The rotor and stator leads have been made entirely separate in Figures 4 and 5 whereas in Figure 1 one of the rotor and one of the stator leads are common. The cam mechanism of Figure 4 is empirically determined and is necessary for the same reason as in the mechanically shifting arrangement of Figure 1 since the change in stall characteristics due to flap position will not be a linear function. As shown in Figure 5, the stator winding 75 of the transmitter 64 is connected to the three phase winding 77 of the rotatable transformer 76, the second three phase winding 78 of which is then connected to the stator of the receiver or indicator 33. Either of the windings 77, 78 is connected to be rotatable, one with respect to the other by the shaft or cable 59 in response to change in position of the wing flap 63. Such rotation will change the relative values of the three phase current input into the receiver or indicator 33 and will, accordingly, change the position of the rotor 79 thereof over that which it would occupy as a result of a direct connection to the transmitter windings. In this arrangement, the receiver or indicator 33 may be rigidly supported as the desired adjustment in the position of the instrument dial in the instrument previously described or in the pointer of a simple angle of attack instrument is effected by electrically changing the characteristics of the input to the receiver so as to vary its rotor position with respect to the rotor of the transmitter.

While certain preferred embodiments of the invention have been specifically disclosed, it is understood that the invention is not limited thereto as many variations will be readily apparent to those skilled in the art and the invention is to be given its broadest possible interpretation within the terms of the following claims.

We claim:

1. In an aircraft instrument, a stationary dial bearing indicia of indicated airspeed, a rotatable dial bearing indicia of angle of attack, a rotatable pointer cooperating with both of said dials and indicating by its position with relation to the indicia thereon the airspeed and angle of attack of the aircraft, means responsive to airspeed connected to effect rotation of said pointer, a differential gearing interconnecting said rotatable dial and said airspeed responsive means and proportioned to effect rotation of said rotatable dial equivalent to rotation of said pointer upon variation in airspeed, and means responsive to angle of attack of the aircraft for effecting movement of said differential gearing bodily to rotate the rotatable dial without effecting movement of the pointer.

2. In an aircraft instrument, a stationary dial bearing indicia of airspeed, a rotatable dial bearing indicia of angle of attack, a rotatable pointer cooperating with both of said dials, a shaft connected to said pointer and having a gear wheel thereon, a rockshaft, a pair of sectors on said rockshaft, one of said sectors meshing with said gear wheel, means responsive to airspeed for effecting rotation of said rockshaft, an idler pinion meshing with the second of said sectors, a gear wheel connected to said rotatable dial upon an axis concentric with the axis of said idler pinion, a shaft bearing pinions of different diameter meshing respectively with said idler pinion and the gear wheel connected to said rotatable dial, whereby rotation of said rockshaft effects common rotation of said pointer and rotatable dial, and means responsive to the angle of attack of the aircraft for effecting rotation bodily of said double pinion shaft about the axes of the idler pinion and rotatable dial gear wheel so as to effect movement of the rotatable dial without moving the pointer upon change only in the angle of attack.

3. In an aircraft instrument, a stationary dial bearing indicia of airspeed thereon, a rotatable dial bearing indicia of angle of attack, a rotatable pointer cooperating with both of said dials, means responsive to changes in airspeed for effecting rotation of said pointer, a differential gearing interconnecting said responsive means and said rotatable dial so as to effect movement thereof common with movement of said pointer in response to change in airspeed, and means responsive to change in angle of attack for moving a portion of said differential gearing bodily to effect movement of said rotatable dial without rotating said pointer.

4. In an aircraft instrument, stationary means providing indicia of airspeed, movable means providing indicia of angle of attack, a pointer cooperating with both sets of indicia, means responsive to airspeed for effecting movement of said pointer, a salient marker of stalling condition on said angle of attack indicia providing means, and means responsive to angle of attack for effecting movement of said means providing indicia of attack relative to said pointer so that the relation of said salient marker to the pointer indicates the relation of the aircraft to its stalling condition, said airspeed responsive means effecting movement of said angle of attack indicia providing means equivalent for movement of said pointer.

5. In an aircraft instrument, means providing indicia of airspeed, means providing indicia of angle of attack, a pointer cooperating with both said indicia to indicate values of airspeed and angle of attack, a diaphragm capsule adapted to be connected to an aircraft Pitot tube to be responsive to the dynamic pressure thereof, a vane whose position varies with variation in the angle of attack of the aircraft, and means for producing relative movement between said pointer and said indicia in response to the position of said vane and the action of said diaphragm capsule to indicate by the position of the pointer relative to the indicia the values of aircraft airspeed and angle of attack.

6. In an aircraft instrument, a stationary dial bearing indicia of airspeed, a moveable dial bearing indicia of angle of attack, a movable pointer cooperating with both said dials, a diaphragm capsule adapted to be connected to an aircraft Pitot tube to be movable in response to changes of pressure therein, a vane whose position changes in response to change in angle of attack of the aircraft, means responsive to movement of said diaphragm capsule for effecting movement of said pointer and movable dial, and means responsive to the position of said vane for moving said movable dial.

7. In an aircraft instrument, a stationary dial bearing indicia of airspeed, a rotatable dial bearing indicia of angle of attack, a movable pointer cooperating with both said dials, a diaphragm capsule adapted to be connected to an aircraft Pitot tube to be movable in response to changes of pressure therein, means responsive to movement of said diaphragm capsule for effecting movement of said pointer, means including a differential gearing for effecting rotation of said rotable dial equivalent to rotation of said pointer upon movement of said diaphragm capsule, means responsive to angle of attack, and means including said differential gearing for rotating said rotatable dial from said angle of attack responsive means.

8. In an aircraft instrument, means providing indicia of air speed, means providing indicia of angle of attack, a pointer cooperating with both sets of indicia to indicate values of air speed and angle of attack thereon, means responsive to air speed for effecting movement of said pointer and angle of attack indicia providing means, means responsive to angle of attack for moving said angle of attack indicia providing means including a self-synchronous motor having its rotor physically connected thereto, and means for modifying the indication of angle of attack in response to change in the aircraft wing characteristic comprising means for bodily rotating the stator of the self-synchronous motor.

9. An instrument for correlating indications of air speed and angle of attack of an aircraft, the instrument comprising a stationary dial and a movable dial concentric with respect to the stationary dial, the stationary dial being calibrated in terms of air speed, the movable dial being calibrated in terms of angle of attack; a movable pointer readable on the calibrations of both dials; means responsive to airspeed connected to said pointer to move said pointer in dependence on the air speed of the craft; means responsive to angle of attack; and actuating means jointly acted upon by said air speed responsive means and said angle of attack responsive means for moving said movable dial in dependence on changes in both air speed and angle of attack.

10. An instrument for correlating indications of air speed and angle of attack of an aircraft, the instrument comprising a stationary dial calibrated in terms of air speed; a movable dial concentric with said stationary dial, said movable dial being calibrated in terms of angle of attack; a movable pointer readable on the calibrations of both dials; means responsive to air speed connected to said pointer to move said pointer in dependence on the air speed of the craft; means responsive to angle of attack; and actuating means jointly acted upon by said air speed responsive means and said angle of attack responsive means for moving said movable dial in dependence on changes in both air speed and angle of attack.

11. An instrument for correlating indications of air speed and angle of attack of an aircraft comprising in combination three cooperating indicating elements of which two are movable and one is stationary, the two movable elements having a common center of motion, said indicating elements including two concentric calibrations one calibration being in terms of airspeed, the other calibration being in terms of angle of attack; means responsive to air speed connected to one of said movable elements for moving it in dependence on air speed, the stationary element being readable on said one movable element; means responsive to changes in the angle of attack of the aircraft; and actuating means jointly acted upon by said air speed responsive means and said angle of attack responsive means for moving said other movable element in dependence on changes in both air speed and angle of attack.

12. An instrument for correlating indications of air speed and angle of attack of an aircraft, the instrument comprising a stationary dial and a movable dial concentric with respect to the stationary dial, the stationary dial being calibrated in terms of air speed, the movable dial being calibrated in terms of angle of attack; a movable pointer readable on the calibrations of both dials; means responsive to airspeed connected to said pointer to move said pointer in dependence on the air speed of the craft; means responsive to angle of attack; actuating means jointly acted upon by said air speed responsive means and said angle of attack responsive means for moving said movable dial in dependence on changes in both air speed and angle of attack; and means responsive to changes in the aerodynamic characteristics of the wing of the craft for modifying the action of said angle of attack responsive means on said movable dial.

13. An instrument for correlating indications of air speed and angle of attack of an aircraft, the instrument comprising a stationary dial and a movable dial concentric with respect to the stationary dial, the stationary dial being calibrated in terms of air speed, the movable dial being calibrated in terms of angle of attack; a movable pointer readable on the calibrations of both dials; means responsive to air speed connected to said pointer to move said pointer in dependence on the air speed of the craft; means responsive to angle of attack; position reproducing means operatively associated with said angle of attack responsive means, said reproducing means including a synchronous transmitter acted upon by said angle of attack responsive means, and a remote synchronous repeater electrically connected to said transmitter for reproducing the transmitter motion, said transmitter and said repeater each including a stator and a rotor; means responsive to changes in the aerodynamic characteristics of the wing of the craft for turning one of said stators in dependence on such changes in characteristics; actuating means jointly acted upon by said air speed responsive means and the rotor of said repeater for moving said movable dial in dependence on changes in both air speed and angle of attack.

14. An instrument for correlating indications of air speed and angle of attack of an aircraft having wings including adjustable wing portions permitting changes in the aerodynamic characteristics of the wings, the instrument comprising three cooperating indicating elements of which two are movable and one is stationary, the two movable elements having a common center of motion, said indicating elements including two concentric calibrations one calibration being in terms of air speed, the other calibration being in terms of angle of attack; means responsive to air speed connected to one of said movable elements for moving it in dependence on air speed the stationary element being readable on said one movable element; means responsive to changes in the angle of attack of the aircraft; actuating means jointly acted upon by said air speed responsive means and said angle of attack responsive means for moving said other movable element in dependence on changes in both air speed and angle of attack; and means coupled with said adjustable wing portions for automatically modifying the action of said angle of attack responsive means on said other movable element in dependence on the adjustment of said wing portion with respect to the remainder of the wing.

VICTOR E. CARBONARA.
JOHN H. ANDRESEN, Jr.

REFERENCES CITED

The following references are of record in the file of this patent:

UNITED STATES PATENTS

| Number | Name | Date |
|---|---|---|
| 1,077,965 | Pollen et al. | Nov. 4, 1913 |
| 1,175,979 | O'Connor | Mar. 21, 1916 |
| 1,332,810 | Danielson | Mar. 2, 1920 |
| 1,504,785 | Reynolds | Aug. 12, 1924 |
| 1,554,915 | Hewlett et al. | Sept. 22, 1925 |
| 1,554,980 | Ellis | Sept. 22, 1925 |
| 1,588,178 | Fales | June 8, 1926 |
| 1,612,117 | Hewlett et al. | Dec. 23, 1926 |
| 1,708,884 | Hewlett et al. | Apr. 9, 1929 |
| 1,891,134 | Barthel | Dec. 13, 1932 |
| 2,029,700 | Boykow | Feb. 4, 1936 |
| 2,193,077 | Saxman | Mar. 12, 1940 |
| 2,237,306 | Hood | Apr. 8, 1941 |
| 2,277,625 | Baynes | Mar. 24, 1942 |
| 2,297,412 | Hoppe | Sept. 29, 1942 |
| 2,412,356 | Roberts et al. | Dec. 10, 1946 |

FOREIGN PATENTS

| Number | Country | Date |
|---|---|---|
| 274,082 | Great Britain | July 26, 1928 |
| 311,326 | Italy | Sept. 27, 1933 |

OTHER REFERENCES

A text book entitled Airplane Design, by Warner, copyrighted 1927, pp. 38 and 39.